3084½X
Z. Harris.
Plow.
Patented Mar. 17, 1819.
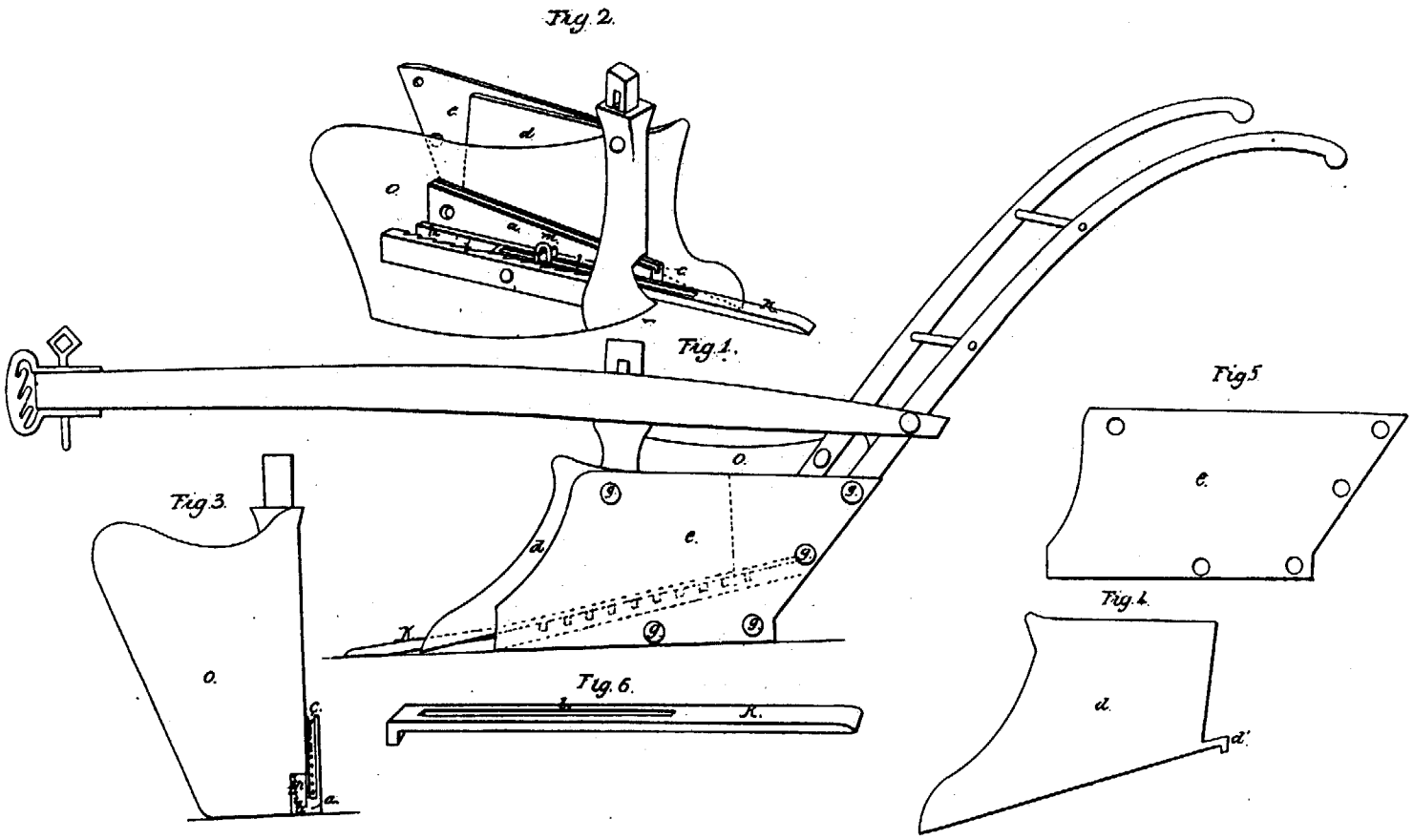

3084½X

UNITED STATES PATENT OFFICE.

ZADOCK HARRIS.

IMPROVEMENT IN PLOWS.

Specification forming part of Letters Patent dated March 17, 1819.

*To all whom it may concern:*

Be it known that I, ZADOCK HARRIS, have invented an Improvement in Plows, of which the following is a specification.

This plow is different from all other plows, inasmuch as the landside is composed of three plates, which are fixed over each other, and the lower or under part of the plow is composed of two plates, with other pieces combined and connected, as hereinafter described. The first landside-plate and the under plate are cast together, each in their proper direction or position, which is nearly at right angles. The lower part of the landside is so formed as to be of double the thickness of the upper part, so that the upper part may receive the cutter, which fits the sunken part and rests on the projecting thickness, which forms an angle of about twelve degrees, rising toward the back part of the plow. At the upper part of said angular line there is a groove or cavity with a number of indents for the purpose of receiving the hooked part of the cutter, by which it may be extended at pleasure when the wearing of the cutter requires it. The cutter is a plate of steeled iron, formed to the shape of the plow in front and of a thickness so as to fill up the sunken part before described. The under side of the upper part of the cutter extends in a narrow form, having a hook at the end, which bends downward and catches in the indents before mentioned. When the last-mentioned plate or cutter is in its place it causes the surface of the landside to be flush and even. Over the above-described plates is placed another plate, which may be called the "shelter-plate," as it receives all the wear of the landside. It extends the whole length of the plow and covers the under structure. The front part partakes of the shape of the cutter and recedes a little from it. It is fastened either by screws or bolts, which make the whole landside firm and secure. The plate of the under side of the plow, which is cast with the first plate of the landside, has on its upper surface an indented groove, the indents of which receive the hooked part of a straight bar, which lies fixed in the groove and projects in front of the plow and forms what is called the "nose." This bar, as it wears in plowing, may be extended and turned at pleasure. On the right-hand side of the above-mentioned groove there is a rising ratchet or toothed edge, the indents of which prevent the under cutter from shifting its situation when in the act of plowing. The under cutter is formed of a proper shape to suit the under part of the plow, and is made either of wrought-iron steeled or entirely of iron. The inner side is bent downward for the purpose of catching in the ratchets or teeth, before mentioned, when wanted to be brought forward when it wears in plowing. Toward the inner side of said cutter there is a long perforation for the purpose of admitting through it the staples rising from the cast plate, which fastens the cutter by a key.

The mold-board is a separate piece, and made of cast-iron, having proper staples or bolts in their proper situations for the purpose of fixing it by keys or otherwise, or it may be fixed by screws.

This new construction of a plow may be adapted to any plow already in use, and the cutters may be made either of steel, wrought-iron, or cast-iron.

ZADOCK HARRIS.

Witnesses:
WM. ELLIOT,
BENJN. FENWICK.